United States Patent

Pfeufer et al.

Patent Number: 5,995,885
Date of Patent: Nov. 30, 1999

[54] METHOD AND ARRANGEMENT FOR MONITORING THE DETECTION OF MEASURED VALUES IN AN ELECTRONIC POWER CONTROL OF A MOTOR OF A VEHICLE

[75] Inventors: Reinhard Pfeufer, Möglingen; Margit Müller, Asperg; Wolfgang Haag, Winnenden; Frank Bederna, Korntal-Münchingen, all of Germany

[73] Assignee: Robert Bosch GmbH, Stuttgart, Germany

[21] Appl. No.: 08/750,051

[22] PCT Filed: Feb. 28, 1996

[86] PCT No.: PCT/DE96/00332

§ 371 Date: Dec. 4, 1996

§ 102(e) Date: Dec. 4, 1996

[87] PCT Pub. No.: WO96/31690

PCT Pub. Date: Oct. 10, 1996

[30] Foreign Application Priority Data

Apr. 7, 1995 [DE] Germany ............... 195 13 081

[51] Int. Cl.⁶ .................................................. G06F 11/30
[52] U.S. Cl. ............................................. 701/29; 73/117.3
[58] Field of Search .............................. 701/29, 31, 34; 702/127, 182, 183, 184; 73/117.3, 116, 118.1, 119 R; 341/120

[56] References Cited

U.S. PATENT DOCUMENTS

| | | |
|---|---|---|
| 4,497,057 | 1/1985 | Kato et al. .................... 371/29 |
| 4,546,646 | 10/1985 | Takahashi ................... 73/117.3 |
| 4,862,364 | 8/1989 | Matsuda ................... 364/424.01 |
| 4,899,130 | 2/1990 | Rossberg ..................... 340/438 |
| 5,107,427 | 4/1992 | Peter et al. ............... 364/424.03 |
| 5,167,212 | 12/1992 | Peter et al. ................... 123/399 |
| 5,207,091 | 5/1993 | Shibata et al. ............... 73/118.1 |
| 5,365,438 | 11/1994 | Mitchell et al. .......... 364/424.03 |
| 5,375,056 | 12/1994 | Nitschke et al. ......... 364/424.03 |
| 5,381,334 | 1/1995 | Furui ...................... 364/424.03 |
| 5,515,027 | 5/1996 | Billig et al. ................. 340/438 |
| 5,590,040 | 12/1996 | Abe et al. ............... 364/424.04 |

FOREIGN PATENT DOCUMENTS

| | | |
|---|---|---|
| 0354269 | 2/1990 | European Pat. Off. . |
| 42 04 623 | 8/1993 | Germany . |
| 57 035419 | 6/1982 | Japan . |

*Primary Examiner*—William A. Cuchlinski, Jr.
*Assistant Examiner*—Arthur D. Donnelly
*Attorney, Agent, or Firm*—Walter Ottesen

[57] ABSTRACT

A method and an arrangement for monitoring the measured-value detection for an electronic power control of a motor of a vehicle is suggested wherein the single computing element outputs a signal which operates on at least one of its input channels or operates indirectly on this at least one input channel by changing the supply voltage. A fault condition is detected when the variable, which is supply via this input channel, exceeds at least one pregiven limit value correlated in time to the output of the control signal.

11 Claims, 6 Drawing Sheets

METHOD AND ARRANGEMENT FOR MONITORING THE DETECTION OF MEASURED VALUES IN AN ELECTRONIC POWER CONTROL OF A MOTOR OF A VEHICLE

BACKGROUND OF THE INVENTION

A method of this kind and an arrangement of this kind is known from DE-OS 36 21 937 (U.S. Pat. No. 5,107,427). There, for fault detection in the area of measured-value detection of an electronic power control, the operating variable of the power control which is detected by a measuring device is influenced. Especially faults in the A/D interfaces or in the channels of a multiplexed A/D converter of the electronic control unit of the power control system can be detected. This fault detection takes place by switching off the ground lead of the position transducer of an accelerator pedal and/or of a throttle flap by means of a switch element actuated by the computing element of the control unit. The position transducer is configured as a potentiometer. If the measured variable detected by the measuring device in the switched-off state exceeds pregiven limit values or limit values derived from the read-in supply voltage of the measuring device, a fault state is recognized.

In several applications, it has been shown that this procedure is not always satisfactory. A control variable of the power control is changed during monitoring. Accordingly, this power control cannot be carried out during the monitoring time.

Furthermore, it has been shown that the monitoring procedure, as a consequence of tolerances in the region of the switching element, the measuring devices as well as the input lines to the control unit, takes considerable time during which the electronic control cannot be carried out (in the range of several 100 milliseconds). Furthermore, additional circuit measures in the area of the switch element are necessary especially with a view toward the resistance to short circuits of the switch element to the battery or supply voltage.

SUMMARY OF THE INVENTION

It is an object of the invention to provide measures which make possible a monitoring of the measured value detection as precise as possible without the occurrence of additional difficulties in the area of the circuitry. The monitoring does not or only slightly influences the power control.

A method or an arrangement for monitoring the detection of measured values of an electronic control apparatus is likewise known from DE-OS 42 04 623. Here too, the ground line of a measuring device for detecting an accelerator pedal position or a throttle flap position is interrupted by a computer element via a switch element. Since, in this case, it is not the measuring device, which determines a command variable of the power control, but a redundant measuring device which forms the basis, the problem with respect to precision or quickness and with respect to the interruption of the power control does not occur to the above extent. Additional switching measures for ensuring the operability must, however, also be provided here.

Finally, in European patent publication 0,354,269 A1, a method and a circuit arrangement for monitoring the transfer resistance of a potentiometer are suggested. There, at predetermined time points, the signal line level is switched via a switching element to ground at predetermined time points by a computer element of the electronic power control and, from the variables available in the computing element, with respect to potentiometer position, voltage in the switched-on state as well as the supply voltage, the actual transfer resistance of the potentiometer is computed. Measures for monitoring the detection of measured values are not described so that a fault state in the area of the A/D converter of the computing element leads to a defective operation of the power control.

With the procedure of the invention for monitoring the detection of measured values for a electronic power control of a motor of a vehicle, additional difficulties in the circuit configuration are avoided and a comprehensive monitoring is nonetheless ensured.

It is especially advantageous that a signal outputted by the computer operates directly on at least one of its input channels, influencing the command variable is unnecessary and no additional difficulties in the circuitry occur.

Furthermore, monitoring by changing the supply voltage of at least one measuring device is advantageous.

In an advantageous manner, the entire input path of the computing element up to the correct address and storage in the computer is tested as to operability and updating capability via the procedure of the invention. With the procedure of the invention, the computing element therefore automatically detects a fault without expecting a reaction of the driver.

The application of the procedure of the invention in the context of an electronic power control of a motor of a vehicle is especially advantageous with the power control being driven by a signal microcomputer. In this way, the redundant configuration of the control unit is unnecessary and the operational reliability of the equipment is nonetheless ensured.

The application of the procedure of the invention in combination with at least one position sensor for the position of a operator-controlled element actuated by the driver such as an accelerator pedal is especially advantageous. As a rule, the position sensor is at least configured to be redundant. For this reason, an advantageous application of the procedure of the invention is provided in combination with the second measuring device which functions to monitor the first measuring device. In this way, the function of the power control is not disturbed even for a slower runthrough of monitoring.

In a further embodiment, the computer element outputs a pregiven signal and again reads in the signal for monitoring. According to this further embodiment, in a multiplexed computer input, a recognition of fault states is made possible as to all A/D channels to be converted as well as a qualitative statement as to the conversion. The above-mentioned advantages with respect to fault detection and influencing the power control apply correspondingly in this embodiment.

This applies also for a change of the feedback of the supply voltage by the computer which defines a further advantageous embodiment of the procedure of the invention.

Especially advantageous is pulling down the supply voltage for at least one measuring device especially at least one position sensor for the accelerator pedal during the output of the signal by the computing element thereby interrupting the monitoring thereof. This advantageous embodiment is realized without additional hardware complexity and can be used for both channels, especially for a double sensor for the accelerator pedal position. In an advantageous manner, the entire input channel including the measuring device can be checked.

A reliable trouble-free fault detection is provided via the time-dependent correlation between drive and fault/detection.

BRIEF DESCRIPTION OF THE DRAWINGS

The invention will now be described with respect to the embodiments shown in the drawing. Here.

DESCRIPTION OF THE PREFERRED EMBODIMENTS OF THE INVENTION

Figure 1:
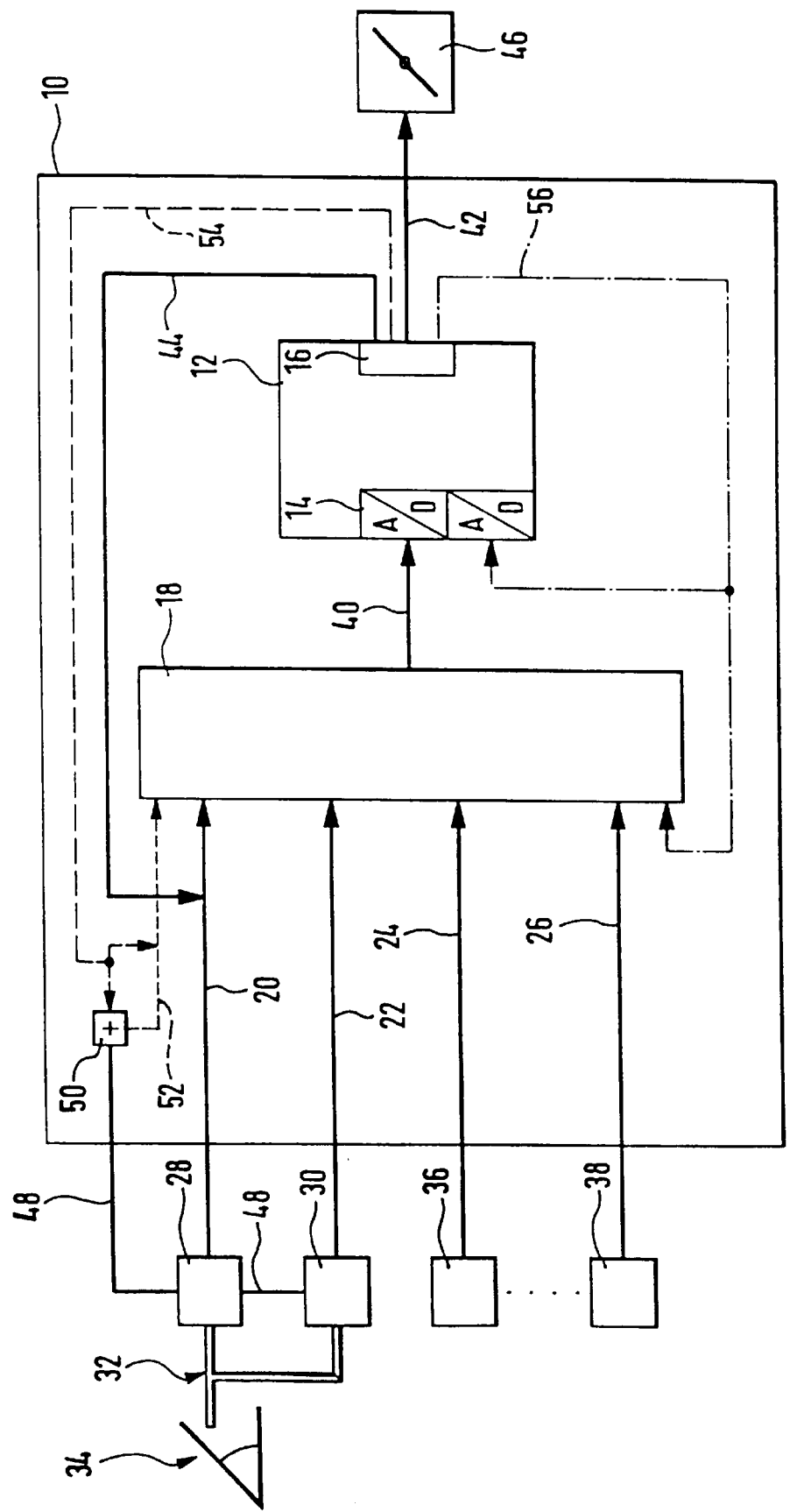
FIG. 1 shows an overview block diagram of an electronic power control.

In FIG. 1, a preferred embodiment of an electronic power control for a motor of a vehicle is shown. Reference numeral 10 identifies a control unit which includes a single microcomputer 12. This microcomputer 12 includes, inter alia, at least an A/D converter 14 as well as an output circuit, 16. Furthermore, the control unit 10 includes a multiplexer 18.

The schematic of the control unit 10 is not complete for the sake of clarity. Only those elements necessary for understanding the procedure of the invention are shown.

Input lines 20, 22 as well as 24 to 26 are connected to the multiplexer 18 and therefore to the control unit 10. The lines 20 and 22 connect the control unit 10 to measuring devices 28 and 30 which are connected via a mechanical connection 32 to an operator-controlled element 34 which is preferably an accelerator pedal and is actuated by the driver. The lines 24 to 26 connect the control unit 10 to measuring devices 36 to 38 for detecting additional analog operating variables such as engine temperature and throttle flap position. An input line 40 leads from the multiplexer 18 to the A/D converter 14 of the microcomputer 12. Output lines 42 and 44 are connected to the output circuit 16 of the microcomputer 12. The output line 42 defines the output line of the control unit 10 and leads to an electrically actuable positioning element 46 for influencing the power of the drive motor. The positioning element 46 is especially an electrical positioning element for the throttle flap of an internal combustion engine. A second output line 44 leads to one of the input lines 20 to 26 on which the microcomputer 12 operates directly and therefore operates on the measured variable supplied via this line.

In a preferred embodiment, the measuring devices 28 and 30 are supplied via the line 48 from a common supply voltage source 50. In an advantageous embodiment (shown by the broken line), the supply voltage is read in by the microcomputer 12 via the line 52. The microcomputer 12 can furthermore operate via the line 54 on the supply voltage source 50 or on the feedback line 52. Correspondingly, and in other advantageous embodiments, for separate supplies of the measuring devices 28 and 30, the following can be influenced: only the supply of only one of the measuring devices or the supply for at least one of the measuring devices 36 to 38.

In a further supplementary or alternate advantageous embodiment (shown by the dash-dot line), the microcomputer 10 has the output line 56 which can be read in via the multiplexer 18, the line 40 and the A/D converter 14 by the microcomputer 12 or directly by the microcomputer 12.

In normal operation, the microcomputer 12 detects the position values for the accelerator pedal via the multiplexer 18 and its A/D converter 14. The position values are detected by the measuring devices 28 and 30. From the measured value of the measuring device 30, the computer forms a desired value for the position of the positioning element 46. The computer forms this desired value from a pregiven characteristic line or a pregiven characteristic field while taking into consideration additional operating variables such as engine rpm, gear ratio et cetera. This positioning element 46 is controlled to the desired value in the context of a position control loop in the sense of approximating the actual value to the desired value. In a power control of this kind, the power outputted by the motor is adjusted based on the actuating value of the accelerator pedal 34. The actuating value is detected by the measuring device 30.

Faults in the area of this measured value detection, the transmission to the computer 12 or faults occurring during read-in into the microcomputer 12 can therefore produce unwanted operating states. A measuring device 28, which is redundant to measuring device 30, is provided for monitoring the detection of measured values in the region of the measuring device 30. The measured value of the redundant measuring device 28 is likewise read in by the microcomputer 12. A fault in one of the measuring devices is detected when the two values, which are detected by the measuring devices 28 and 30, deviate impermissibly from each other.

Furthermore, measures are to be provided which permit an adequate monitoring of at least the transmission of the measured values to the microcomputer 12 or during read in into the microcomputer. If only one microcomputer 12 is used for power control, fault states can occur notwithstanding the redundant configuration of the measuring devices. These fault states can occur when the microcomputer 12 no longer updates the read-in position values as a consequence of fault conditions in the multiplexer 18, in the A/D converter 14 or in its internal computation and storage. Then, the two position measured values are within the tolerance range but nonetheless represent incorrect measured values.

In order to detect such fault additions, it is therefore provided by the invention that the microcomputer 10 outputs a signal at pregiven time points which operates directly on at least one input channel via which a measured variable is read in or a signal which operates indirectly on an input channel via changing the supply voltage of at least one measuring device for detecting an operating variable. A fault state can then be detected when, once or several times, the expected signal value is not detected. This signal value is correlated in time dependence with the output of the signal. This takes place in that the signal value is compared to pregiven limit values and, when at least one of the pregiven limit values is exceeded by the read-in manipulated measured magnitude, a fault can be detected.

When considering it in another way, when switching the measurement variable to low values, a fault is detected when the pregiven value range is not reached, that is, there is not a drop below the limit value. When switching to higher values, the fault is detected when the limit value is not exceeded.

In a first embodiment (see FIGS. 2 and 6), the input line, which is assigned to at least one of the two measuring devices 28 and 30, is pulled to a pregiven signal level by means of a switching signal outputted by the computer 12. The input line is preferably assigned to measuring device 28. If an expected signal value is not detected by the computer correlated in time with the output of the control signal, then a fault condition in the area of measured value detection is assumed. In a second advantageous embodiment (see FIG.

3), the microcomputer outputs a signal via a digital output port which is read in again via an additional channel. If a pulsewidth modulated output signal is used and this signal is filtered at the analog input by means of a lowpass, then a comprehensive monitoring of the input part of the microcomputer can be carried out. For fault detection, here too, distinguishable signals are outputted in a defined time raster and the value, which is read in again, is compared to the expected value. A third embodiment (FIG. 4) shows monitoring with respect to the feedback of the supply voltage of at least one measuring device for the position of the accelerator pedal. For this purpose, a switching signal is outputted by the microcomputer and this switching signal pulls the feedback of the supply voltage to a pregiven potential. A fault condition is detected when the expected signal is not detected or at least when there is not a drop below the limit value or when the limit value is not exceeded. The expected signal is correlated in time with the output of the control signal. According to a fourth embodiment (FIG. 5), the supply voltage of at least one measuring device is changed. This procedure is suitable especially for systems wherein a common voltage supply is formed via a discretely built up circuit, for example, a current level. The common voltage supply is for the measured-value transducer. The microcomputer intervenes in this circuit in such a manner that the supply voltage is switched to a pregiven level. A fault condition is detected as shown above by reading in the measured values of the measuring devices and comparing them to pregiven limit values.

Figure 2:
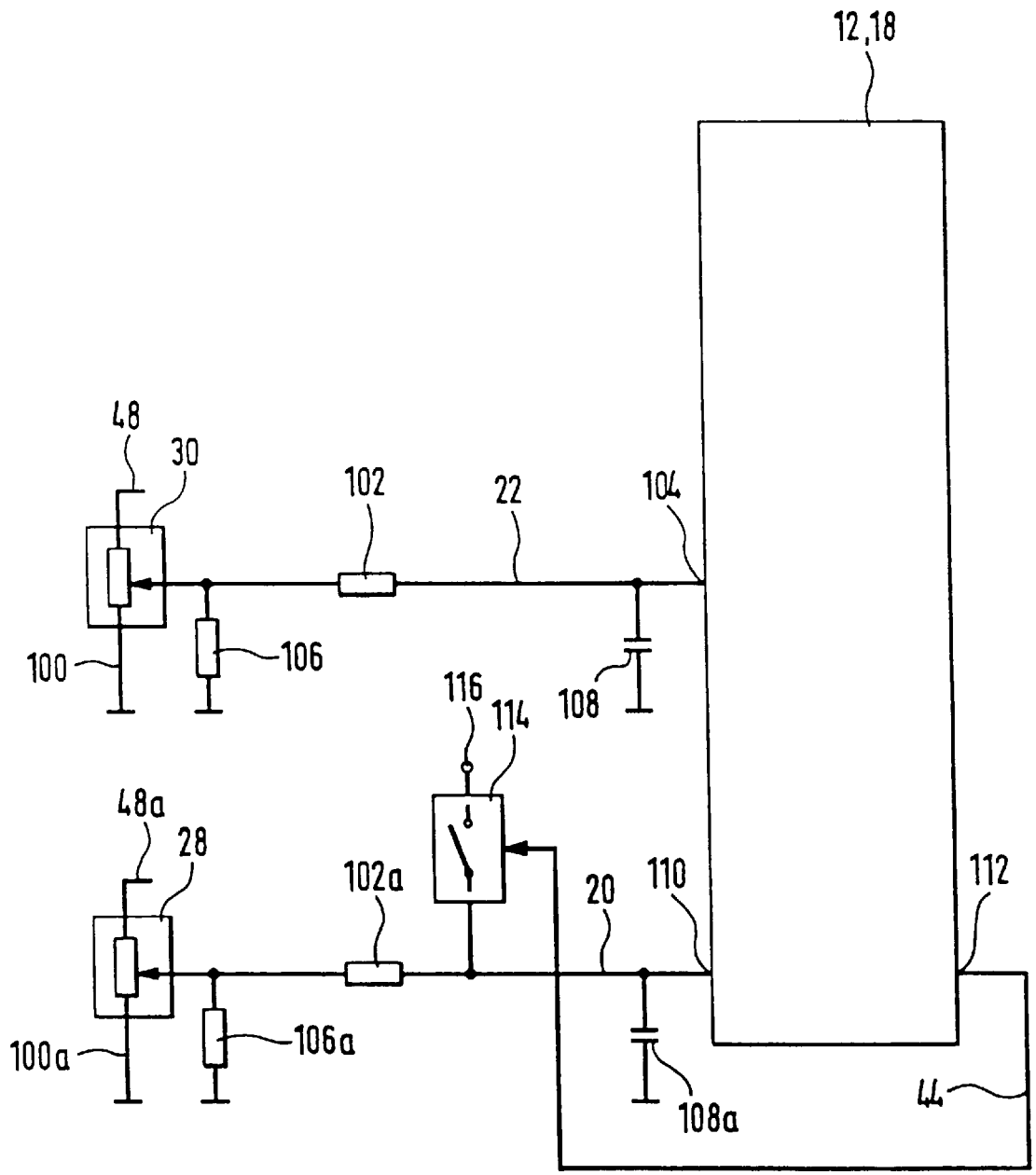
FIG. 2 shows a first embodiment.

In the embodiment of FIG. 2, the measuring devices 28 and 30 define potentiometers for detecting position of an accelerator pedal. The potentiometers are connected via respective lines (48, 48a) to a voltage source and via respective lines (100, 100a) to ground. The wiper contact line 22 of the measuring device 30 leads via a resistor 102 to the input 104 of the microcomputer 12. A further resistor 106 is connected on the line 22 between potentiometer and resistor 102. A capacitor 108 is connected to ground between the resistor 102 and input 104. In the same way, the measuring signal of the potentiometer 28 is lead to another input 110 of the microcomputer 12. The line 44 is connected to the output 112 of the microcomputer 12. The line 44 leads, in the preferred embodiment, to a switching element 114 which is connected between the line 20 and a reference voltage source 116. The switching element 114 is, in an advantageous manner, connected between the resistor 102a and capacitor 108a. A voltage is to be used as a reference voltage and is connected to the terminal 116 which lies outside of the measuring signal voltage range of the potentiometer 28. Ground potential or a reference voltage between 0 and the minimum voltage of the potentiometer signal range (for example, 0.5 volts) has been shown to be suitable. A connection to the supply voltage or to a voltage value between the supply voltage (for example, 5 volts) and the maximum signal voltage (for example, 4.5 volts) is likewise advantageous.

In a preferred embodiment, the switching element 114 is a switching transistor which is connected with its collector directly to the line 20. In an especially advantageous embodiment, and with appropriate dimensioning, the output 112 of the microcomputer is connected directly and without a switching element to the line 20 for switching the line 20 to ground or to another potential value.

At its output 112, the microcomputer generates a switching signal which switches the input voltage of the A/D converter to a reference voltage level. The A/D converter is located behind the input 110. Since the computer recognizes the time point at which it drives the switch, the computer expects, within a pregiven window of time, a specific feedback to its input channel or to an internally converted value in its memory cell. If this feedback does not correspond to the expected values, then a conclusion is drawn as to the existence of a fault condition.

Figure 6:
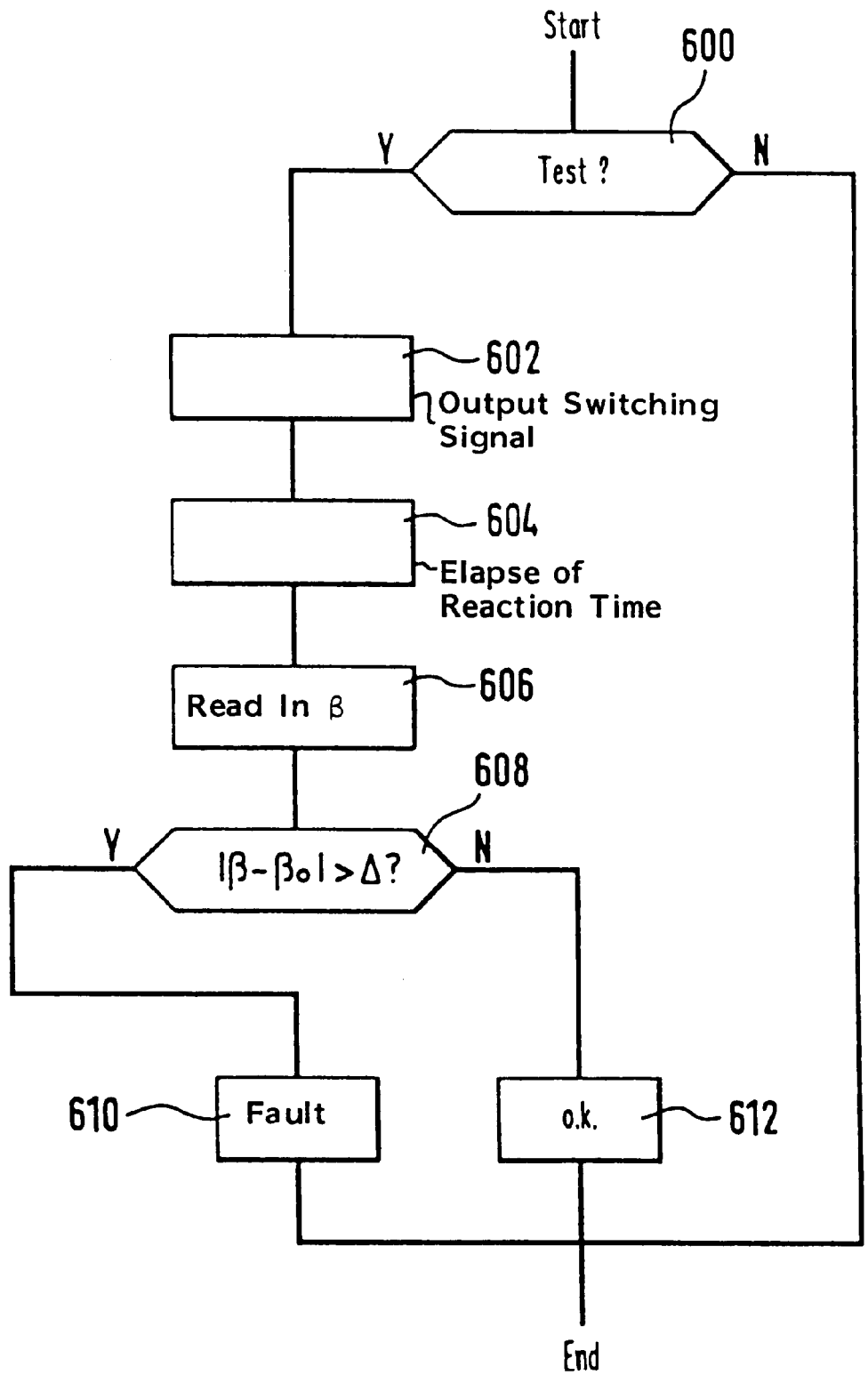
FIG. 6 shows a realization of the monitoring of the invention as a computer program in the context of a flow-chart for the first and preferred embodiment.

This procedure is shown with respect to the flowchart in FIG. 6. After the start of the subprogram shown in the flowchart, a check is made in the first step 600 as to whether the conditions for a monitoring procedure are present. In a preferred embodiment, this monitoring procedure takes place at pregiven time points or after an elapse of a predetermined operating duration. A significant advantage is that the check is always possible independently of the operating state.

Otherwise, in step 602, the switching signal is outputted and, in the next step 604, the pregiven reaction time is awaited. If this reaction time has elapsed, the measuring value $\beta$ is read in in step 606 and, in the next step 608, this measuring value $\beta$ is compared to a pregiven value $\beta 0$. If the amount of the difference is greater than a predetermined tolerance value $\Delta$, then, in accordance with step 610, a fault is assumed. Otherwise, and according to step 612, the measured value detection is recognized as being operational. After the steps 610 and 612, the subprogram is ended and repeated at a pregiven time.

It is understood that the recognition of the fault can be dependent from a multiple recognition of the fault or from the frequency of the occurrence of the fault. A counter is incremented for each runthrough of the program when a fault is present and is decremented when no fault is present. If the count of the counter exceeds a pregiven value, the detection of measured values is recognized as being defective.

It is especially advantageous to apply the procedure described in the first embodiment to the measuring variable operating to monitor the command variable of the power control. In this way, a slower runthrough (for example, 100 milliseconds) can be selected without the power control being disturbed. An advantage is that with short check times within the fault detection time, the comparison between the two position measurement signals for fault detection must not be interrupted.

In the context of the first embodiment, the entire path from the input of the A/D channel via the A/D conversion up to the correct addressing and storage in the computer, is tested as to operability and updating capability. For a switchover to a pregiven reference potential, the converted value can, in addition, be quantitatively checked in the context of the switching tolerances.

Figure 3:
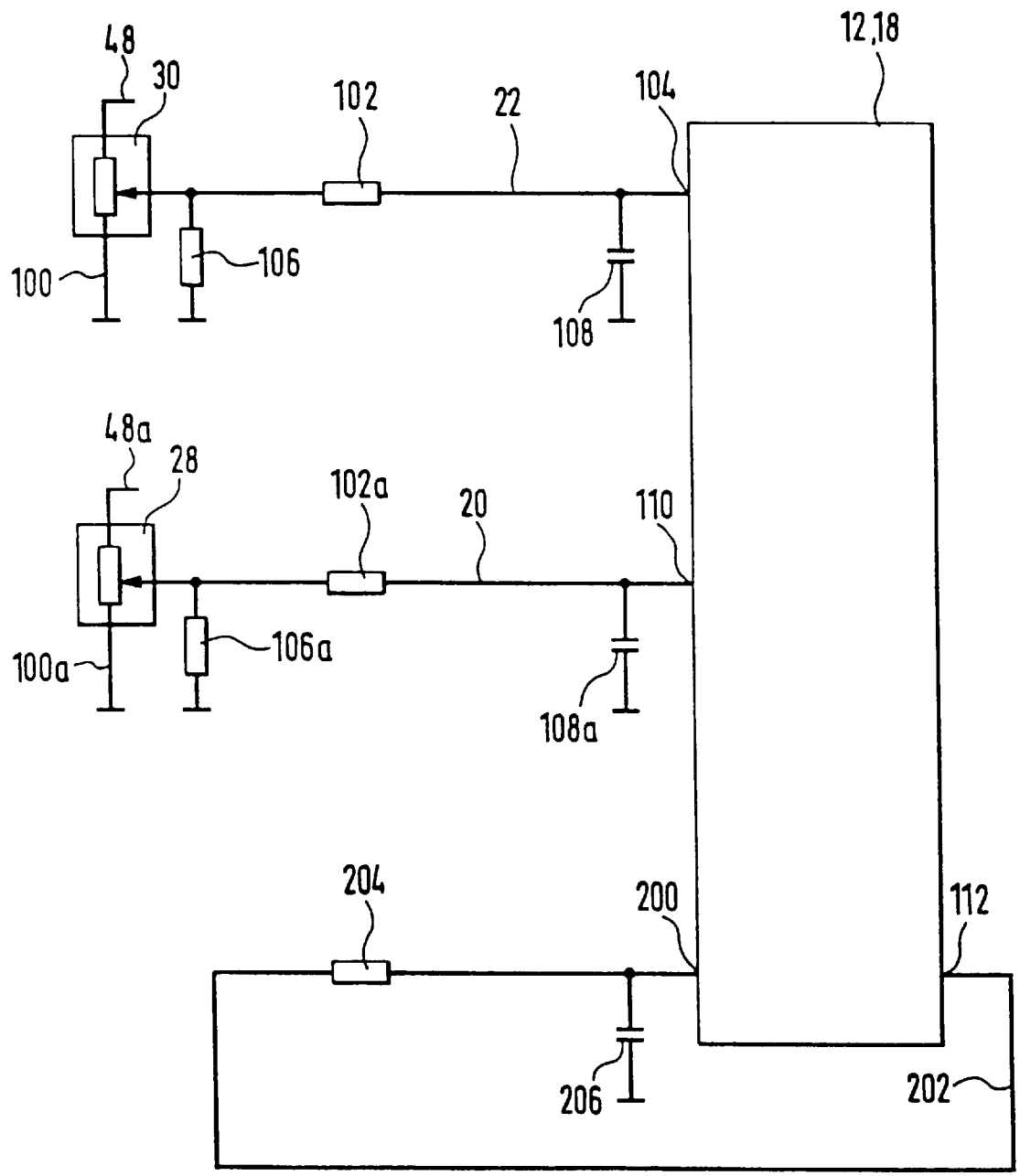
FIG. 3 shows a second embodiment.

In the second embodiment of FIG. 3, a signal is pregiven via the output 112 of the computer and is again read in via an input 200 of the microcomputer. The signal pregiven at the output 112 can have any desired form. However, it has been shown to be suitable to output a pulsewidth modulated signal at the output 112. This signal is conducted via the line 202 and via a lowpass comprising the resistor 204 and the capacitor 206 to the input 200. The microcomputer reads in the converted signal and compares the signal to the outputted signal magnitude in a pregiven time raster. A fault is detected when the read-in value deviates impermissibly from the outputted value. The magnitude of the outputted signal can be varied in an advantageous manner. In this way, as well as by inputting a pulsewidth modulated signal, a quantitative statement as to the A/D converter is possible. For example, an offset of the A/D converter can be detected.

Figure 4:
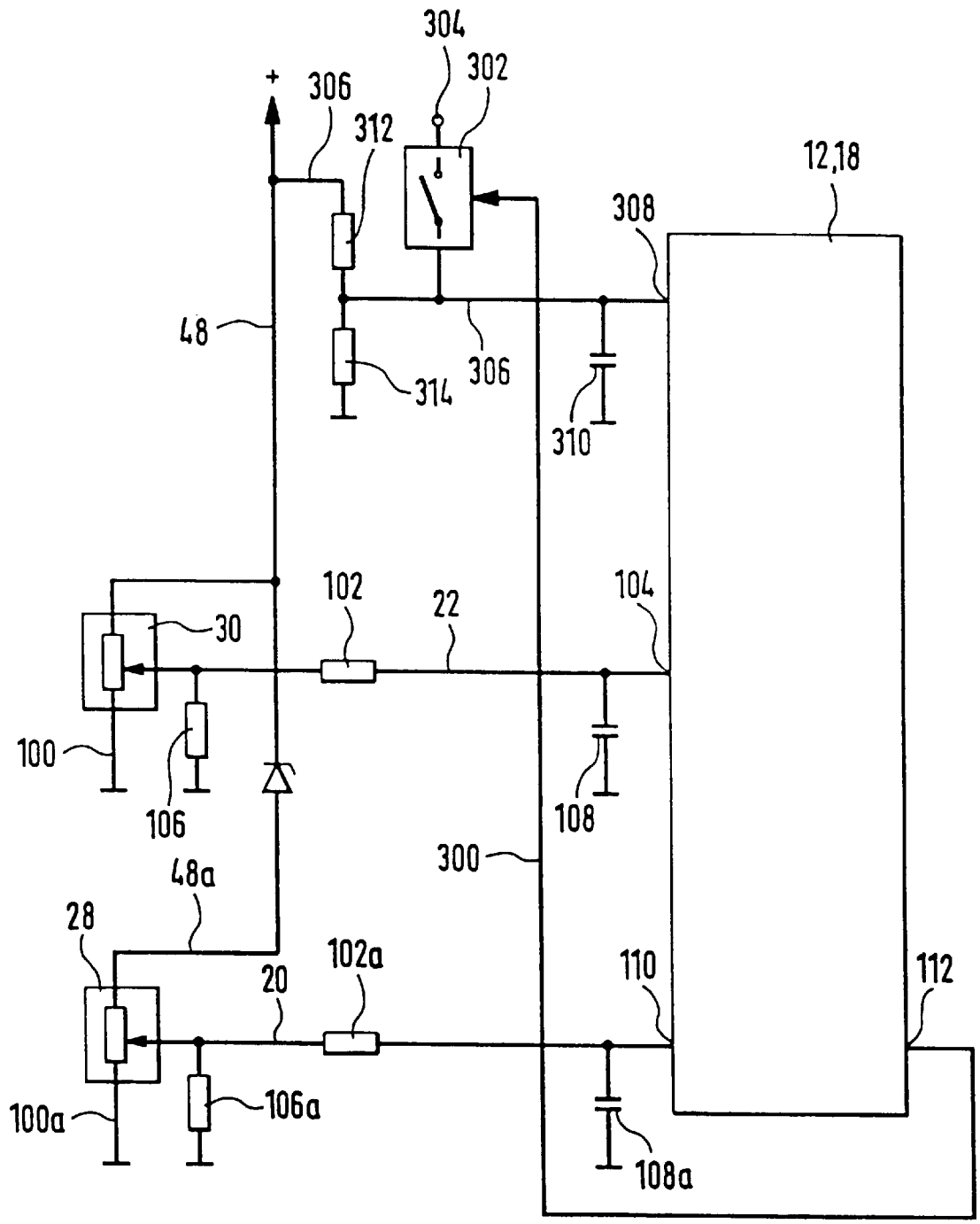
FIG. 4 shows a third embodiment.

In the third embodiment shown in FIG. 4, the procedure of the invention provides that a switching element 302 is driven via the output 112 of the microcomputer and the line 300. The switching element is connected between a reference voltage 304 and a line 306. The line 306 leads then to an input 308 of the microcomputer. A capacitor 310 is connected to ground from the line 306. The supply voltage supplied to the measured-value transducers 28 and 30 is conducted on line 306 to the microcomputer via a voltage divider comprising the resistors 312 and 314. The microcomputer controls the switching element 302 at pregiven time points and pulls the feedback of the supply voltage to a pregiven signal level, preferably, to ground or to VCC (supply voltage 5 volts). Here too, for a correspondingly dimensioned circuit, the computer can switch the voltage directly without a switch. The updating capability of the A/D converter detection is checked via cyclically repeating this operation.

Figure 5:
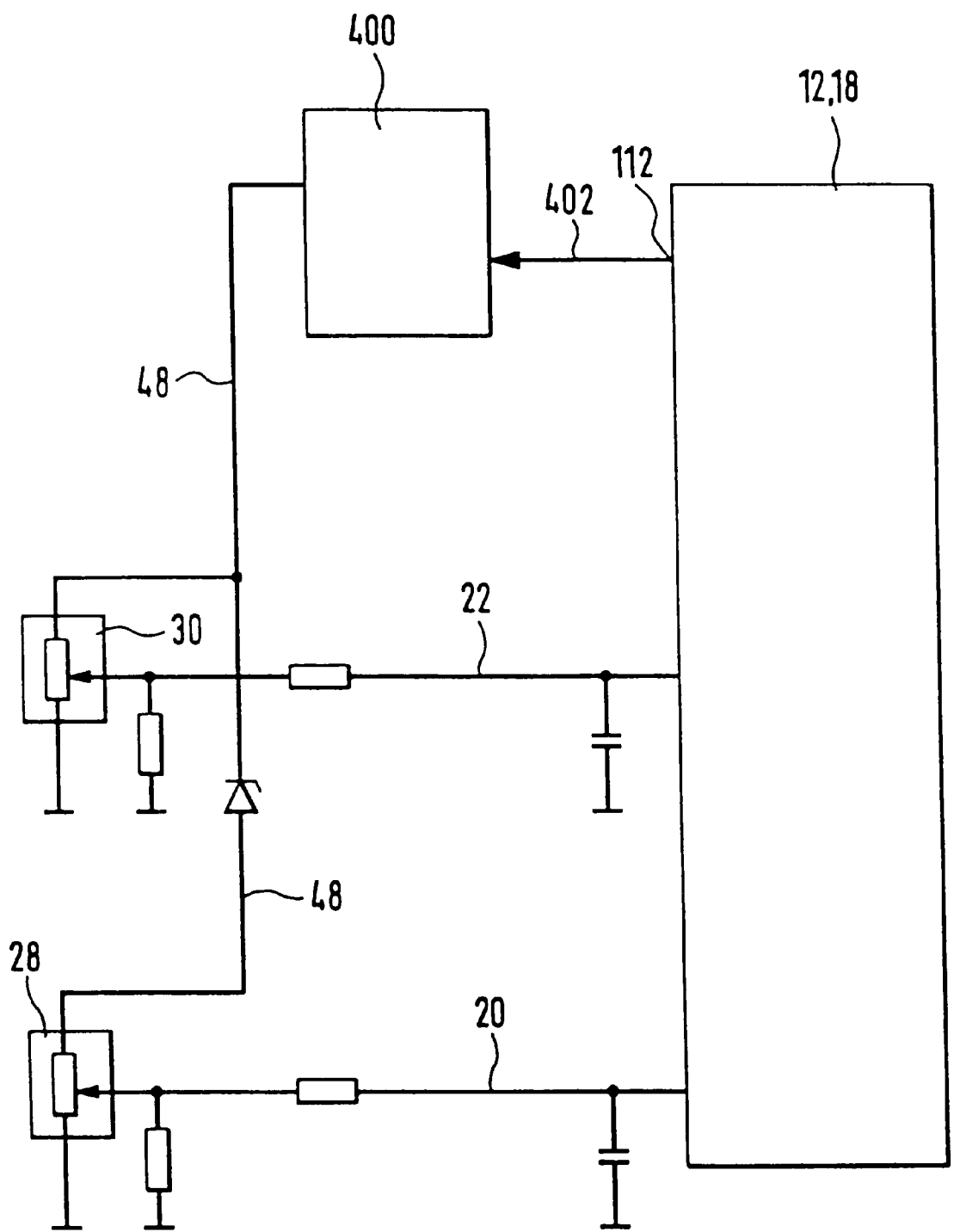
FIG. 5 shows a fourth embodiment of the procedure of the invention.

A further advantageous configuration is shown with respect to the embodiment of FIG. 5. There, a current-balancing circuit 400 is shown to provide a common voltage supply of the measuring devices 28 and 30. The microcomputer system can directly influence this supply voltage source via an output 112 and via the line 402. Preferably, the intervention leads to a drop of the supply voltage. In this way, the measured values read in via lines 20 and 22 are changed. Operability is assumed when the change of the measured signal values is correlated with the intervention via the line 402 in pregiven tolerance ranges. Otherwise, a fault condition is detected. With this procedure, the command variable of the electronic power control is changed but only for a short time. In this example, the check must take place quickly because the command variable is influenced. During the intervention into the supply voltage, the use of the command variable must be interrupted. This procedure guarantees the monitoring of both input channels as well as of the entire path from the measuring device to the internal memory cell of the microcomputer.

We claim:

1. A method for monitoring the detection of a measured value for a motor power control system of a motor vehicle, the system including a measuring device for detecting a measured value (β) for an operating variable of the motor or of the motor vehicle, and the measuring device having a voltage supply and the method comprising the steps of:

transmitting said measured value from said measuring device via a line to a computing element having an analog-to-digital converter for converting said measured value into a digital value;

adapting said computing element to read in said measured value into said computer element and to convert said measured value into a digital value and to evaluate said measured value when controlling the power of said motor; and, said computing element being adapted to execute the following steps for monitoring the detection of said measured value:

(a) outputting an output signal at pregiven time points to directly control said measured value to a specific value or to indirectly change said measured value to a specific value by a change of said voltage supply of said measuring device;

(b) detecting the changed measured value in time-dependent correlation to the outputting of said output signal; and, (c) detecting a fault when the detected changed measured value does not correspond to an expected value.

2. The method of claim 1, wherein said line is a measurement signal line which leads from the measuring device to an input of the computer element, with the signal level on said measurement signal line being pulled to a pregiven voltage level by the signal outputted by the computing element.

3. The method of claim 2, wherein said pregiven voltage level lies outside of the measured signal level range of the measuring device and preferably defines ground.

4. Method of claim 2, wherein the measured value is conducted via a resistor and a capacitor to the computing element, the capacitor being connected to ground, with the signal line being closed between the resistor and the capacitor, the signal line bringing the signal line to a pregiven signal level as a consequence of the signal outputted by the computing element.

5. The method of claim 2, wherein the measuring device is a position transducer for the position of an accelerator pedal; a second position transducer for the position of the accelerator pedal being provided which detects the command variable for the motor power control system and the first measuring device being provided for monitoring the second measuring device.

6. The method of claim 5, wherein the monitoring of at least one of the measuring devices is interrupted during the output of the signal by the computing element.

7. The method of claim 1, wherein the computing element outputs a signal which is read in via an input, the signal being a pulsewidth modulated signal which is converted via switching means into a steady-state signal level which is read in by the computing element for monitoring and fault detection.

8. The method of claim 1, wherein a measure for the supply voltage of the measuring device is supplied to the computing element via an input line, this feedback of the supply voltage being conducted by the signal to a pregiven signal level, the signal being outputted by the computing element.

9. The method of claim 1, wherein a voltage supply circuit is provided which defines a common voltage supply source for two measuring devices for detecting the position of an accelerator pedal, the computing element being adapted to operate on said voltage supply circuit to reduce the supply voltage and a fault condition is derived based on the magnitudes of the signal values of the two measuring devices.

10. An arrangement for monitoring the detection of a measured value for a motor power control system of a motor vehicle, the system including a measuring device for detecting a measured value (β) for an operating variable of the motor or of the motor vehicle, and the measuring device having a voltage supply, the arrangement comprising:

a computing element having an analog-to-digital converter for converting said measured value into a digital value;

a line connecting said measuring device to said computing element for transmitting said measured value to said computing element;

said computing element having an analog-to-digital converter for converting said measured value into a digital value;

said computing element being adapted to read in said measured value into said computer element and to convert said measured value into a digital value and to evaluate said measured value when controlling the power of said motor; and, said computing element being configured to execute the following functions for monitoring the detection of said measured value:

(a) output an output signal at pregiven time points to directly control said measured value to a specific value or to indirectly change said measured value to a specific value by a change of said voltage supply of said measuring device;

(b) detect the changed measured value in time-dependent correlation to the output of said output signal; and, (c) detect a fault when the detected changed measured value does not correspond to an expected value.

11. The arrangement of claim 10, wherein a measuring signal line leads to an input of the computing element to which a switching element is connected for switching said line to a pregiven signal level in dependence upon said output signal outputted by said computing element.

* * * * *